M. WINTERSCHEID & B. SCHULTES.
DEVICE FOR FEEDING SALT TO CATTLE.

No. 177,778.   Patented May 23, 1876.

WITNESSES:
H. Rydquist
John Goethals

INVENTOR:
M. Winterscheid
B. Schultes
BY
ATTORNEYS.

UNITED STATES PATENT OFFICE.

MATHIAS WINTERSCHEID AND BERNARD SCHULTES, OF MENDOTA, ILL.

IMPROVEMENT IN DEVICES FOR FEEDING SALT TO CATTLE.

Specification forming part of Letters Patent No. 177,778, dated May 23, 1876; application filed April 18, 1876.

*To all whom it may concern:*

Figure 1:
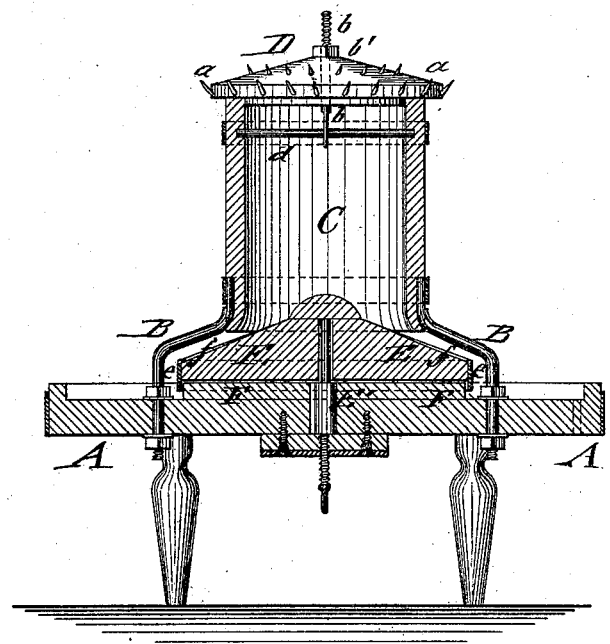
Figure 2:
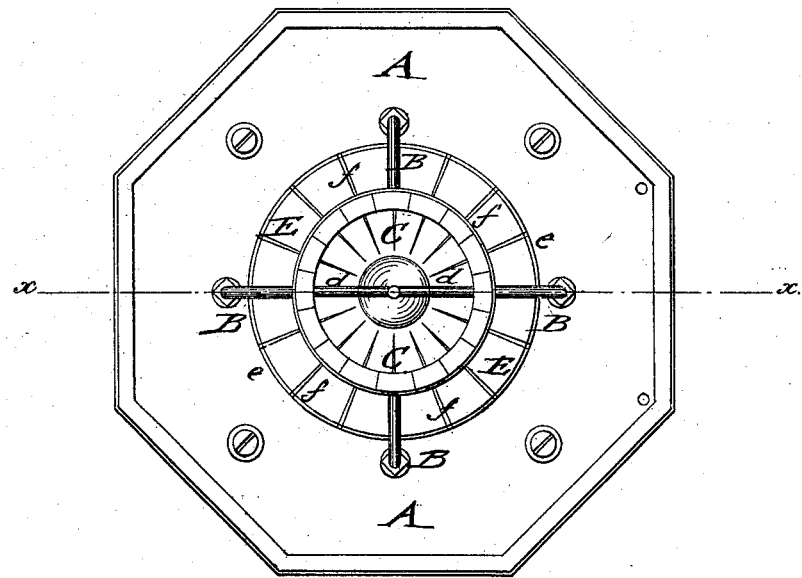

Be it known that we, MATHIAS WINTERSCHEID and BERNARD SCHULTES, of Mendota, county of La Salle, and State of Illinois, have invented a new and Improved Device for Feeding Salt to Cattle, of which the following is a specification:

In the accompanying drawing, Figure 1 represents a vertical central section on the line $x\ x$, Fig. 2, of our improved device or apparatus for feeding salt to cattle, and Fig. 2 is a top view of the same.

Similar letters of reference indicate corresponding parts.

Our invention has for its object to furnish to farmers an improved device or apparatus by which salt may be fed and distributed to horses, cattle, sheep, &c., in perfectly reliable and even manner; and the invention consists of a table with stationary top receptacle for the salt, and a conical revolving salt-distributer that is adjustable to greater or lesser distance from the bottom rim of the receptacle, and provided with radial feed-channels.

In the drawing, A represents a round, octagonal, or other table, that is supported on legs, driven into the ground at suitable height, as required, for the animals to be fed. The table is made with a circumferential rim to prevent the accidental dropping of salt. The surface of the table may preferably be inclined, and small holes arranged at the lower side to admit the running off of the water in rainy weather.

Above the table A is supported, on arms B, at suitable height, the salt-receptacle C, made of cylindrical or other shape, and of wood, or of iron lined with wood to prevent rusting. The top D of the salt-receptacle is provided with spurs $a$, to keep the animals off the same. The lid or top D is applied firmly to the cylinder by a hook-bolt, $b$, attached to a diametrical rod, $d$, of the salt-receptacle, and, by screw-nut $b'$, turning on the binding-bolt $b$.

The salt-receptacle C is open at the lower part, and beveled or curved in outward direction to feed the salt readily to the conical distributer E, that is placed at suitable distance from the lower edge of the receptacle, and revolved on a central spindle, $E'$, of the table.

The spindle $E'$ may be adjusted, by a screw-bolt at the under side of the table, to greater or lesser height, so that the distance between the receptacle and distributer may be made larger or smaller according as the salt has to be fed quicker or slower, and according to the condition of the salt, whether it is dry or damp, &c.

The distributer E turns, by a circumferential guide-rim, $e$, on a disk-shaped plate, F, between table and distributer, to prevent the entering of salt between the same, and to secure the regular rotation of the distributer.

The distributer E has radial channels $f$, by which the cattle are enabled to turn the distributer to secure a continuous feed of salt from the receptacle until the same is exhausted.

The apparatus is made of a size in proportion to the number of animals to be fed, and enables farmers to furnish the required supply of salt to their animals, and distribute it evenly in a regular and reliable manner.

Having thus described our invention, we claim as new and desire to secure by Letters Patent—

1. The device or apparatus for feeding salt to cattle, consisting of a table with salt-receptacle above the same, and a conical revolving salt-distributer, substantially as and in the manner specified.

2. The combination of the bottom rim of the salt-receptacle with the vertically-adjustable conical distributer, to increase or decrease the width of the opening between the same, for the purpose specified.

3. The salt-receptacle, having a detachable top lid with spurs locked to the same, substantially as specified.

4. The combination of the revolving distributer, having outer guide flange or rim, with a disk-shaped plate of the table, to prevent entering of the salt below the distributer, as specified.

5. The conical salt-distributer, provided with radial feed-channels, to assist in being turned, as specified.

MATHIAS WINTERSCHEID.
BERNARD SCHULTES.

Witnesses:
CARL BAUSMANN,
GEORGE HAEFNER.